United States Patent [19]

Gath et al.

[11] 3,992,372

[45] Nov. 16, 1976

[54] PROCESSING POLYCAPROLACTAM EXTRACTION LIQUORS

[75] Inventors: Rudolph Hans Gath, Mannheim; Hugo Fuchs, Ludwigshafen; Ruediger Schmitz, Frankenthal; Klaus Kartte, Beindersheim; Uwe Brand, Rosengarten, all of Germany

[73] Assignee: BASF Aktiengesellschaft, Ludwigshafen (Rhine), Germany

[22] Filed: Mar. 20, 1975

[21] Appl. No.: 560,313

[30] Foreign Application Priority Data

Apr. 2, 1974 Germany............................ 2415873

[52] U.S. Cl..................... 260/239.3 A; 260/78 S; 159/47 UA; 159/47 R; 159/47 WL
[51] Int. Cl.$^2$........................................ C07D 201/16
[58] Field of Search............ 260/239.3 A; 159/47 A, 159/47 R, 47 WL

[56] References Cited
UNITED STATES PATENTS

| | | | |
|---|---|---|---|
| 2,221,369 | 11/1946 | Cass............................ | 260/239.3 A |
| 2,249,177 | 7/1941 | Schlack...................... | 260/239.3 A |
| 2,749,212 | 6/1956 | Crowder..................... | 159/47 R |
| 2,839,122 | 6/1958 | Laguilharre................ | 159/47 R |
| 3,439,724 | 4/1969 | Mason......................... | 159/47 R |

*Primary Examiner*—Henry R. Jiles
*Assistant Examiner*—Robert T. Bond
*Attorney, Agent, or Firm*—Johnston, Keil, Thompson & Shurtleff

[57] ABSTRACT

A process for processing polycaprolactam extraction liquors by evaporation of water and distillation of the residue in which the evaporation of water is carried out in a plurality of stages and the evaporation energy for the removal of the bulk of the water is taken from the heat liberated in the rearrangement of cyclohexanone oxime to caprolactam in oleum or sulfuric acid by using the extraction water for cooling the rearrangement mixture and utilizing the heat absorbed by the extraction water for the concentration of this extraction water by evaporation of water.

3 Claims, 1 Drawing Figure

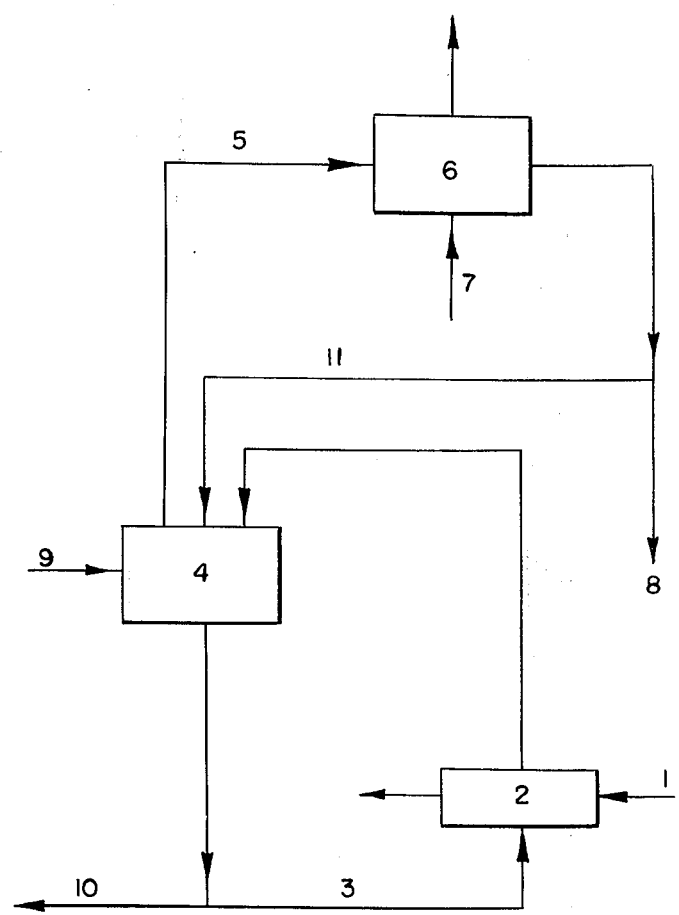

PROCESSING POLYCAPROLACTAM EXTRACTION LIQUORS

The polycondensation of caprolactam into polycaprolactam is carried out to an equilibrium which lies at 90% of polycaprolactam and 10% of monomeric caprolactam and low molecular weight lactam oligomers. This low molecular weight fraction is as a rule removed from the polymer by extraction with water. The extract thus obtained is composed of from 75 to 80% of monomers and from 20 to 25% of oligomers. From 5 to 10% by weight aqueous lactam oligomer solutions are obtained as a rule.

It is also known that these aqueous lactam-oligomer solutions can be concentrated in multistage evaporator plant and monomeric caprolactam can be recovered from the residue by distillation.

As a rule the energy for evaporating the said solutions has to be introduced by supplying steam. It is possible to carry out the evaporation in a plurality of stages in order to utilize the introduced energy more than once.

The rearrangement heat liberated in the rearrangement of cyclohexanone oxime to caprolactam in sulfuric acid or oleum is withdrawn through a separate cooling cycle (cooling being effected by water or air). The heat absorbed by the water or air is dissipated to the environment which is usually the atmosphere and this means that valuable energy remains unutilized in this process (GDR Pat. No. 61,801).

We have now found that aqueous polycaprolactam extraction liquors can be processed much more simply and economically by carrying out the evaporation of water in a plurality of stages and taking the evaporation energy for removing the bulk of the water from the heat liberated in the rearrangement of cyclohexanone oxime into caprolactam in oleum or sulfuric acid by using the extraction water for cooling the rearrangement mixture and utilizing the heat absorbed from the extraction water for concentrating the said extraction water by evaporation of water.

An advantageous embodiment of the process consists for example in passing the rearrangement mixture obtained in the rearrangement of cyclohexanone oxime in oleum and/or sulfuric acid into a plant such as is shown diagrammatically in the drawing from a line 1 through a cooler 2, for example a tubular cooler, hair-pin cooler or plate heat exchanger to transfer the heat. At the same time an aqueous extraction liquor 3 obtained in the polycondensation of caprolactam is allowed to flow in on the water side of the cooler. The rearrangement mixture is thus cooled in the range of temperature from 80° to 160° C by about 10° C while the aqueous extraction liquor is heated from temperatures of from 30° to 135° C to temperatures of from 40° to 145° C. The heated aqueous extraction liquor is then passed into a water evaporation vessel 4 and an appropriate amount of water 5 is evaporated by lowering the pressure. The water vapor is condensed in a cooler 6 by means of a coolant 7 and wholly or partly removed from the cycle through line 8. At the same time fresh extract solution 9 is allowed to flow into the water evaporation vessel 4. Evaporation of water may be carried out at subatmospheric, atmospheric or superatmospheric pressure. It is advantageous however to work at a pressure of from 50 to 760 torr. The concentrated extract is continuously withdrawn from the plant through line 10 and processed.

Further processing usually consists in the complete removal of water, advantageously carried out in a plurality of stages, the vapors from the first evaporator serving to heat the following stage and so on. Recovery of the caprolactam from the remaining residue is carried out by distillation.

The aqueous extract liquor which is to be concentrated is advantageously brought to a pH of more than 7 prior to evaporation. Evaporation may then be carried out in standard steel apparatus without any risk of corrosion. It is also possible to recycle some or all of the evaporated water 11 depending on the amount of heat to be withdrawn and/or on the amount of aqueous extract liquor of a given concentration which is available. The concentration of the concentrated aqueous extraction water depends on the solubility of the oligomers at the given temperature. Any desired concentration may be set up within this range.

The following Example will illustrate the invention.

EXAMPLE 5 parts per hour of aqueous extraction liquor with a concentration of 10% by weight of caprolactam and oligomers and 90% by weight of water and a temperature of 80° C is fed per hour to a cooling cycle having a circulating amount of 100 parts per hour and a concentration of 20% of caprolactam by weight and 80% by weight of water. The aqueous extraction liquor flows through a heat exchanger inserted in the cycle to the product side of which rearrangement mixture is supplied. The heat of rearrangement is thus given up to the aqueous extraction liquor. The latter heats up by 20° C and the rearrangement mixture cools by 5° C. The heated aqueous extraction liquor is passed into a water evaporation vessel in which 4 parts of water per hour is evaporated at a pressure of 380 mm Hg. The water vapor condensed in a downstream air-cooled heat exchanger. 2.5 parts per hour of the amount of condensate obtained is discharged and the remaining amount of condensate is returned to the water-evaporating vessel. 2.5 parts per hour of aqueous extraction liquor having a concentration of 20% by weight of caprolactam and oligomers and 80% by weight of water is withdrawn continuously from the cooling cycle. This solution is further freed from water by a conventional method and the monomeric caprolactam is separated from the residue by distillation of the oligomers.

We claim:

1. A process for concentrating aqueous polycaprolactam extraction liquors by evaporation of water which comprises rearranging cyclohexanone oxime into caprolactam in oleum or sulfuric acid with liberation of heat, cooling of the rearrangement reaction mixture via indirect heat exchange with an aqueous polycaprolactam extraction liquor by absorbing heat from said rearrangement mixture, thereby raising the temperature of said liquor, feeding said heated liquor to an evaporator, also feeding to said evaporator a second aqueous polycaprolactam extraction liquor containing a lower polycaprolactam concentration than that of the heated liquor, and evaporating water from the composite of the two liquors in said evaporator.

2. A process as claimed in claim 1, withdrawing from said evaporator an aqueous polycaprolactam extraction liquor having a higher polycaprolactam concentration than that of said second liquor, and using part of withdrawn liquor for said indirect heat exchange.

3. A process as claimed in claim 2 carried out continuously by continuously feeding said liquors to said evaporator and continuously evaporating water from the composite of the two liquors, continuously withdrawing aqueous polycaprolactam extraction liquor from said evaporator, continuously passing the latter liquor by said indirect heat exchange to heat said liquor, and feeding continuously said latter heated liquor to said evaporator.

* * * * *